(12) United States Patent
Parker et al.

(10) Patent No.: US 11,485,107 B1
(45) Date of Patent: Nov. 1, 2022

(54) LAMINATE SANDWICH PANEL

(71) Applicant: Space Systems/Loral, LLC, Palo Alto, CA (US)

(72) Inventors: Michael Parker, Livermore, CA (US); Jude Zils, Santa Cruz, CA (US); Russell L. Beck, Gilroy, CA (US); Douglas William Dietz, Menlo Park, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 756 days.

(21) Appl. No.: 15/818,539

(22) Filed: Nov. 20, 2017

(51) Int. Cl.
*B32B 3/12* (2006.01)
*B32B 37/06* (2006.01)
*B32B 37/10* (2006.01)
*B32B 37/12* (2006.01)

(52) U.S. Cl.
CPC .............. *B32B 3/12* (2013.01); *B32B 37/06* (2013.01); *B32B 37/1018* (2013.01); *B32B 37/1207* (2013.01); *B32B 2605/00* (2013.01); *B32B 2607/00* (2013.01)

(58) Field of Classification Search
None
See application file for complete search history.

(56) References Cited

U.S. PATENT DOCUMENTS

| | | | |
|---|---|---|---|
| 2,960,197 A * | 11/1960 | Langhans | B21D 47/00 428/116 |
| 3,639,106 A | 2/1972 | Yate | |
| 4,439,774 A | 3/1984 | Johnson | |
| 4,578,303 A * | 3/1986 | Kundinger | B32B 5/26 428/116 |
| 4,833,029 A * | 5/1989 | DuPont | B32B 3/12 428/116 |

(Continued)

FOREIGN PATENT DOCUMENTS

| | | |
|---|---|---|
| CN | 1301850 C | 2/2007 |
| GB | 613529 A | 11/1948 |

OTHER PUBLICATIONS

Butukuri et al. ; Evaluation of Skin-core adhesion bond of out-of-autoclave honeycomb sandwich structures; Journal of Reinforced Plastics and Composites; 31(5) pp. 331-339 (Year: 2012).*

(Continued)

*Primary Examiner* — Elizabeth Collister
(74) *Attorney, Agent, or Firm* — Weaver Austin Villeneuve & Sampson LLP (57) ABSTRACT

A laminated structure includes a front facesheet, a rear facesheet and a core arrangement disposed there between. The core arrangement includes a plurality of ribs, the ribs disposed so as to form walls defining a reticulated lattice of cells. The ribs have a thickness in a first direction and a height in a second direction approximately orthogonal to the facesheets and to the first direction that extends between the first adhesive joint and the second adhesive joint, the height being at least 100× larger than the thickness. The core arrangement is bonded to the front facesheet by curing a first adhesive joint and bonded to the rear facesheet by curing a second adhesive joint, the first adhesive joint and the second adhesive joint being concurrently cured (co-cured) under pressure.

20 Claims, 7 Drawing Sheets

(56) References Cited

U.S. PATENT DOCUMENTS

| | | | |
|---|---|---|---|
| 5,175,401 A * | 12/1992 | Areas | G10K 11/172 |
| | | | 181/292 |
| 5,686,930 A | 11/1997 | Brydon | |
| 9,051,735 B2 * | 6/2015 | Gerritsen | E04C 2/28 |
| 9,606,044 B1 | 3/2017 | Bohlen | |
| 2004/0113863 A1 | 6/2004 | Stonier | |
| 2009/0000737 A1 | 1/2009 | Calgua et al. | |
| 2013/0295321 A1 | 11/2013 | Demetriou et al. | |
| 2014/0130657 A1 | 5/2014 | Pilpel et al. | |
| 2017/0043549 A1 * | 2/2017 | Stute | B32B 27/04 |
| 2019/0351650 A1 * | 11/2019 | Sohn | B32B 15/10 |

OTHER PUBLICATIONS

Hexcel; HexWeb Honeycomb Attributes and Properties; pp. 1-22 (Year: 1999).*

Russell et al. (Quasistatic Deformation and Failure Modes of Composite Square Honeycombs), Journal of Mechanics of Materials and Structures, vol. 3 (7), (2008), pp. 1315-1340 (Year: 2008).*

* cited by examiner

LAMINATE SANDWICH PANEL

TECHNICAL FIELD

This invention relates generally to a laminated material, and more particularly to a laminate sandwich panel having facesheets adhered to a core with concurrently cured adhesive joints.

BACKGROUND OF THE INVENTION

The assignee of the present invention designs and manufactures spacecraft that include structures such as equipment panels, antenna reflectors and solar array panels. Such structures may be configured as honeycomb sandwich panels such as described, for example, in U.S. Pat. Nos. 5,686,930 and 9,606,044 and U.S. Pat. Pub. 2004/0113863, assigned to the assignee of the present invention, the disclosures of which are hereby incorporated by reference in their entirety into the present disclosure.

Figure 1:
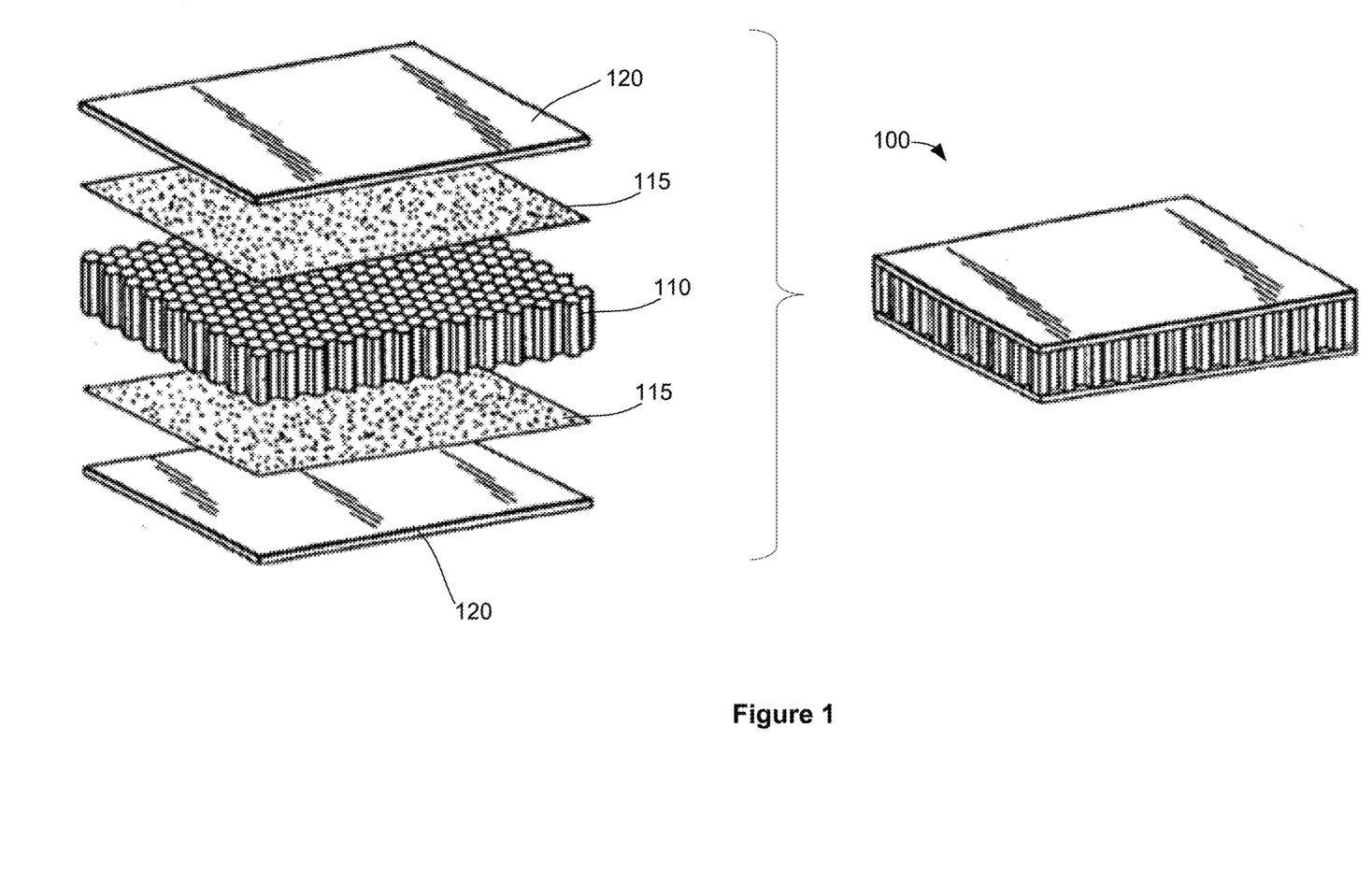
FIG. 1 illustrates a honeycomb sandwich panel.

FIG. 1 illustrates a typical honeycomb sandwich panel 100. Panel 100 includes a honeycomb core 110 sandwiched between panel faceskins 120. The panel faceskins 120 are adhered to the honeycomb core 110 by adhesive layers 115. The honeycomb core 110 of FIG. 1 may serve as a lightweight spacer between the faceskins 120, creating distance between the faceskins and increasing planar stiffness and strength of the assembled sandwich panel. The core may be formed from a metal such as aluminum, or a composite material. Fabrication techniques for such cores usually result in standard sized blocks that are subsequently cut into planar slices for use in panels. The slices may be limited by the cell geometry in their ability to conform to shapes other than the flat planes in which they are cut.

Each cell in the honeycomb core 110 is intended to be vented (by slitting or perforating, for example) so as to permit air to escape during launch as the spacecraft leaves the earth's surface and experiences a depressurization from approximately one atmosphere of pressure to the vacuum of space. In practice, however, it has been found that some cells of an as-fabricated honeycomb panel may exhibit manufacturing defects as a result of which the defective cells fail to comply with the design intent of providing safe venting means. Such manufacturing flaws are difficult to completely prevent and may be difficult to detect by conventional inspection or nondestructive test techniques.

In view of the above mentioned problems, improved design and fabrication techniques for laminate sandwich panel cores are desired.

SUMMARY

According to some implementations, a laminated structure includes a front facesheet, a rear facesheet and a core arrangement disposed between the front facesheet and the rear facesheet. The core arrangement includes a plurality of ribs, the ribs disposed so as to form walls defining a reticulated lattice of cells. The ribs have a thickness in a first direction and a height in a second direction approximately orthogonal to the facesheets and to the first direction that extends between the first adhesive joint and the second adhesive joint, the height being at least 100× larger than the thickness. The core arrangement is bonded to the front facesheet by curing a first adhesive joint and bonded to the rear facesheet by curing a second adhesive joint, the first adhesive joint and the second adhesive joint being concurrently cured (co-cured) under pressure.

In some examples, each rib may have a first edge surface facing the front facesheet and a second edge surface facing the rear facesheet and one or both of the first adhesive joint and the second adhesive joint may be formed by: reticulating a first film adhesive over the first edge surfaces, reticulating a second film adhesive over the second edge surfaces and concurrently curing an assembly of the core arrangement coupled with the front facesheet by the first reticulated film adhesive and coupled with the rear facesheet by the second reticulated film adhesive. In some examples, reticulating one or both of the first film adhesive and the second film adhesive may include disposing an adhesive layer upon a facing surface of the core arrangement and heating one or both of the adhesive layer and the core arrangement. In some examples, curing the assembly may include encapsulating the assembly in a flexible enclosure impermeable to air and reducing a pressure interior to the flexible enclosure. In some examples, a pressure exterior to the flexible enclosure may be one atmosphere or greater. In some examples, curing the assembly may include heating the assembly to an elevated temperature. In some examples, the elevated temperature may be at least 300 F. In some examples, the first edge surface is not parallel to the second edge surface. In some examples, one or both of the first edge surface and the second edge surface may be curved.

In some examples, one or more of the ribs may include at least one perforation configured to provide a vent path for one or more of the reticulated lattice of cells.

According to some implementations, a spacecraft includes a laminated structure configured as an equipment panel, a solar array panel or an antenna reflector, the laminated structure including a front facesheet, a rear facesheet and a core arrangement disposed between the front facesheet and the rear facesheet, the core arrangement adhered to the front facesheet by a first adhesive joint and adhered to the rear facesheet by a second adhesive joint. The core arrangement includes a plurality of ribs, the ribs disposed so as to form walls defining a reticulated lattice of cells. The ribs have a thickness in a first direction and a height in a second direction approximately orthogonal to the facesheets and to the first direction that extends between the first adhesive joint and the second adhesive joint, the height being at least 100× larger than the thickness. The first adhesive joint and the second adhesive joint are concurrently cured under pressure.

In some examples, each rib may have a first edge surface facing the front facesheet and a second edge surface facing the rear facesheet and one or both of the first adhesive joint and the second adhesive joint may be formed by reticulating a first film adhesive over the first edge surfaces, reticulating a second film adhesive over the second edge surfaces; and concurrently curing an assembly of the core arrangement coupled with the front facesheet by the first reticulated film adhesive and coupled with the rear facesheet by the second reticulated film adhesive. In some examples, reticulating one or both of the first film adhesive and the second film adhesive may include disposing an adhesive layer upon a facing surface of the core arrangement; and heating one or both of the adhesive layer and the core arrangement.

In some examples, one or more of the ribs may include at least one perforation configured to provide a vent path for one or more of the reticulated lattice of cells.

According to some implementations, a method of fabricating a laminated structure includes bonding a core arrangement to a front facesheet by curing a first adhesive joint and bonding the core arrangement to a rear facesheet by curing a second adhesive joint. The first adhesive joint and the second adhesive joint are concurrently cured (co-cured) under pressure. The core arrangement is disposed between the front facesheet and the rear facesheet, the core arrangement including a plurality of ribs, the ribs disposed so as to form walls defining a reticulated lattice of cells. The ribs have a thickness in a first direction and a height in a second direction approximately orthogonal to the facesheets and to the first direction that extends between the first adhesive joint and the second adhesive joint, the height being at least 100× larger than the thickness.

In some examples, each rib may have a first edge surface facing the front facesheet and a second edge surface facing the rear facesheet and the first adhesive joint and the second adhesive joint may be formed by: reticulating a first film adhesive over the first edge surfaces, reticulating a second film adhesive over the second edge surfaces and concurrently curing an assembly of the core arrangement coupled with the front facesheet by the first reticulated film adhesive and coupled with the rear facesheet by the second reticulated film adhesive. In some examples, curing the assembly may include encapsulating the assembly in a flexible enclosure impermeable to air and reducing a pressure interior to the flexible enclosure. In some examples, curing the assembly includes heating the assembly to an elevated temperature. In some examples, one or both of the first edge surface and the second edge surface may be curved.

In some examples, one or more of the ribs may include at least one perforation configured to provide a vent path one or more of the reticulated lattice of cells.

BRIEF DESCRIPTION OF THE DRAWINGS

Features of the invention are more fully disclosed in the following detailed description of the preferred embodiments, reference being had to the accompanying drawings, in which.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

Figure 2:
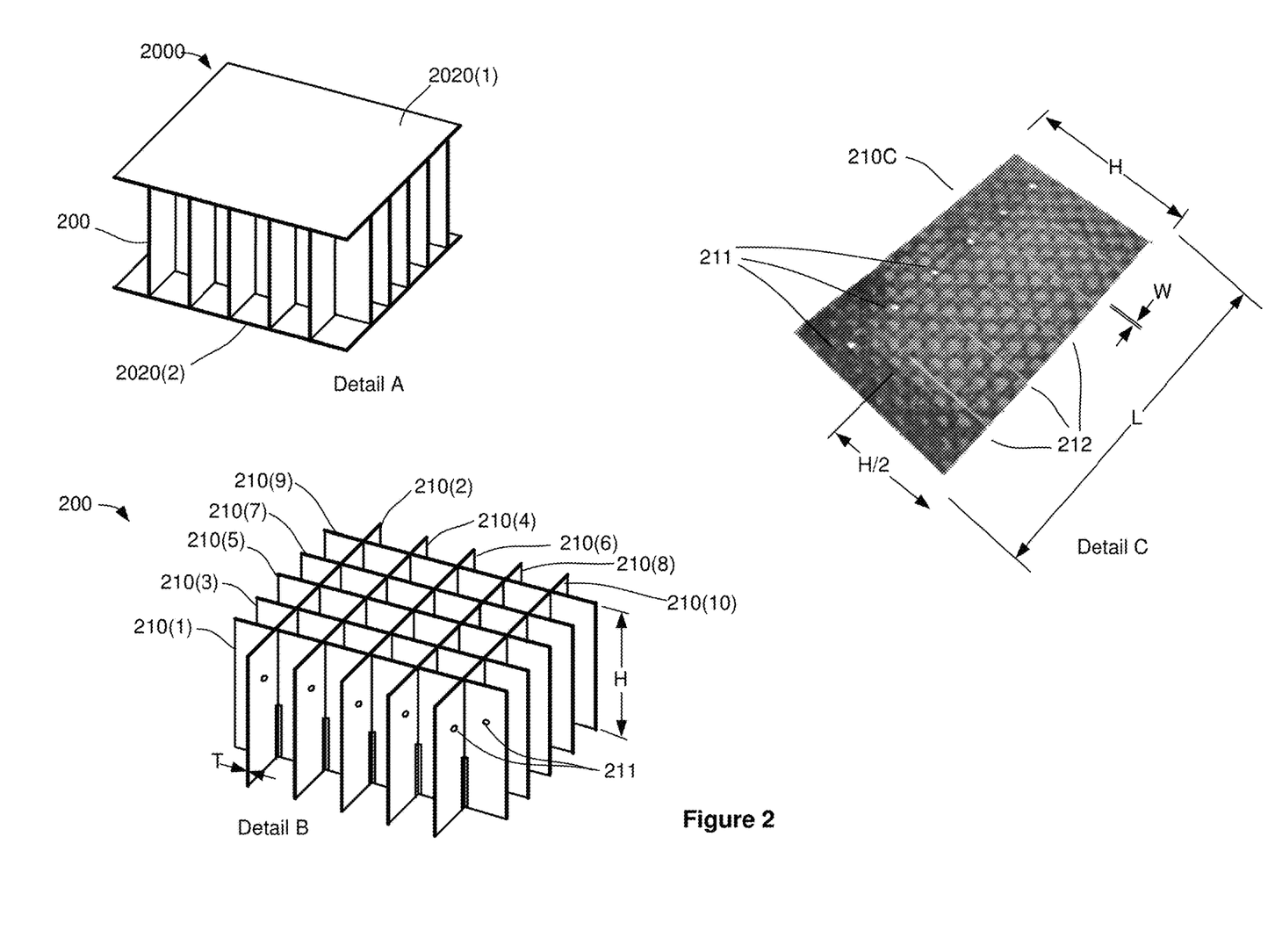
FIG. 2 illustrates an example of a laminate sandwich panel, according to an implementation.

The presently disclosed techniques contemplate a laminated structure including a core arrangement disposed between a front facesheet and a rear facesheet. Referring to FIG. 2, Detail A illustrates an example of a laminate sandwich panel, according to an implementation. A laminate sandwich panel 2000 includes a core arrangement 200, a front facesheet 2020(1) and a rear facesheet 2020(2). The core arrangement 200, which may be better observed in Detail B, may be bonded to the front facesheet 2020(1) by a first adhesive joint and bonded to the rear facesheet 2020(2) by a second adhesive joint.

The core arrangement 200 may include a plurality of ribs 210(i). For example, in the illustrated implementation, the core arrangement 200 includes ribs 210(1), 210(2), 210(3), 210(4), 210(5), 210(6), 210(7), 210(8), 210(9) and 210(10). Referring to Detail C, the ribs 210 may be configured to have a form factor similar to the example rib 210C, but it will be appreciated that the ribs 210 are not necessarily respectively identical. In addition, a rib 210 is not necessarily rectangular, and may include one or more curved edges that may or may not be parallel. As a result, when the ribs are assembled to form a core arrangement, the core arrangement may be configured to have a front facing surface and a rear facing surface that are not necessarily flat nor parallel. Indeed, the front facing surface and the rear facing surface may be independently shaped to distinctly different contours by appropriate design of the ribs.

The ribs may be disposed so as to form walls defining a reticulated lattice of cells. For example, as may be better observed in Detail B, in the illustrated implementation the core arrangement 200 has sixteen cells having a rectangular cross section. The ribs have a thickness, T, and a height, H, where H is defined to be in a direction approximately orthogonal to the facesheets, and to a direction of the thickness T, and may extend between the first adhesive joint and the second adhesive joint. A length, L, of a rib 210 may be larger than height W or approximately the same as height W. Advantageously, the ribs may be configured such that H is much larger (at least 100× larger) than T. For example, in some implementations, T may be less than approximately 20 mils, while W may be 2 inches or greater.

One or more of the ribs 210 may include perforations and slots. Referring still to Detail C, for example, rib 210C includes perforations holes 211 and slots 212. The perforations 211 may be sized so as to allow a vent path through which air may safely evacuate from the laminate sandwich panel 2000 during launch ascent and may, accordingly, also be referred to as vent holes. The slots 212 may have a width, W, slightly larger than the thickness T, such that a plurality of ribs 410 may be assembled together to form the core arrangement. In some implementations, the slots 412 may have a length or depth greater or approximately equal to h/2.

The assembly process may include a dry fit of the plurality of ribs 410, followed by application of an adhesive. Advantageously, mechanical attachment hardware and welding, brazing, or secondary bonding operations may be avoided.

Fabrication of the laminate sandwich panel 2000 may include bonding the front facesheet 2020(1) and the rear facesheet 2020(2) to the core arrangement 200. More particularly, a respective adhesive joint may be disposed between (a) the front facesheet 2020(1) and a first face of the core arrangement 200 and between (b) the rear facesheet 2020(2) and a second, opposite, face of the core arrangement 200. The resulting assembly, including the first adhesive joint and the second adhesive joint, may be co-cured under pressure and/or elevated temperature. As a result, an adhesive bond between the core arrangement 200 and each of the front facesheet 2020(1) and the rear facesheet 2020(2) may be established.

Referring again to Detail B of FIG. 2 may be observed that each rib 210(i) has an edge surface that faces the front facesheet 2020(1). An opposite edge surface (not illustrated) of each rib 210(i) faces the rear facesheet 2020(2). One or both of the respective adhesive joints between the core arrangement 200 and the front facesheet 2020(1) and the rear facesheet 2020(2) may be formed by reticulating a film adhesive over the respective edge surfaces of the ribs 201(i).

Figure 3:
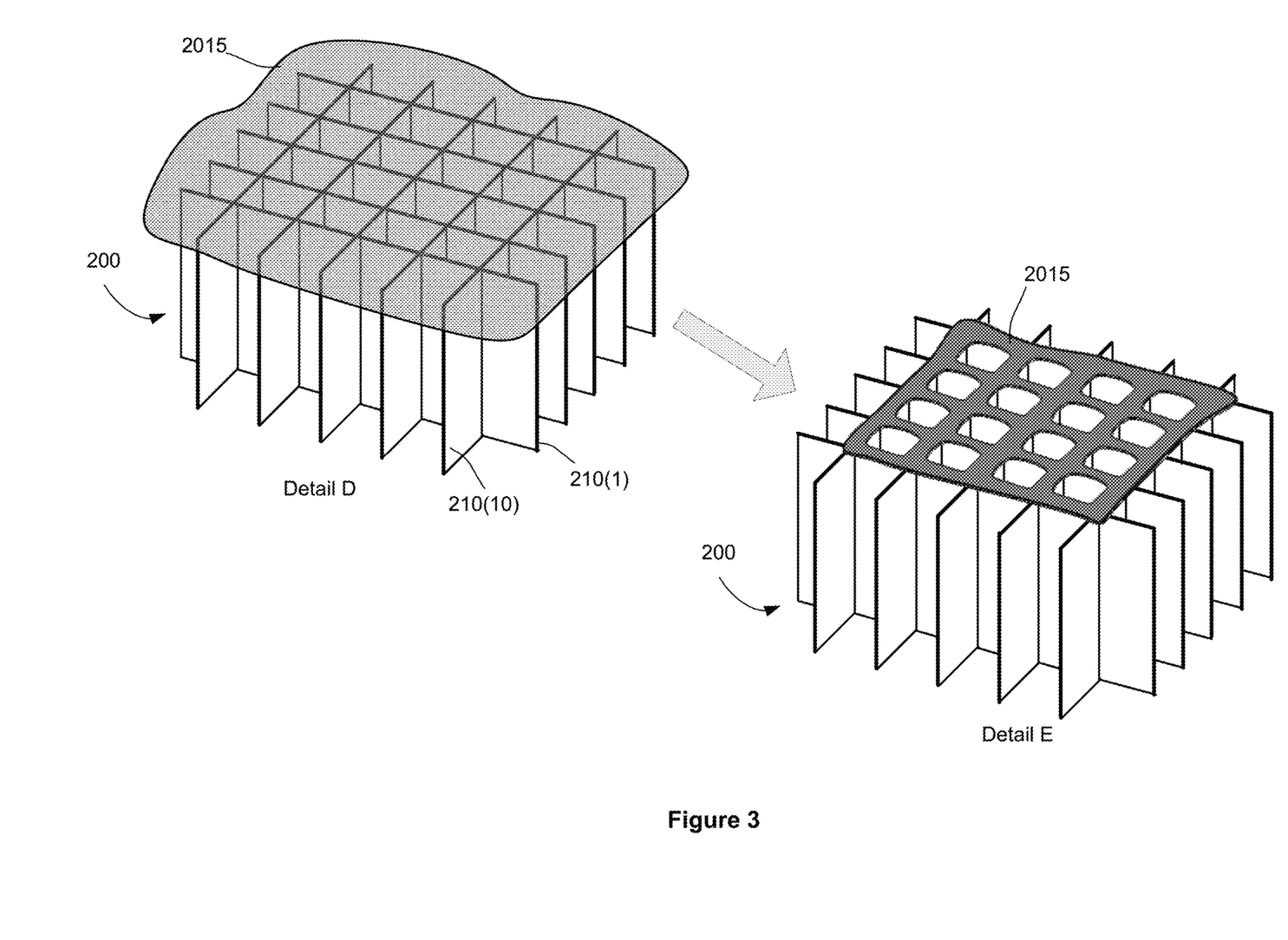
FIG. 3 illustrates an example of reticulating a film adhesive over edge surfaces of the ribs, according to an implementation.

FIG. 3 illustrates an example of reticulating a film adhesive over edge surfaces of the ribs 201(1). In the illustrated example, referring first to Detail D, a thin adhesive layer 2015 is disposed upon a facing surface of the core arrangement 200. Application of heat to the resulting assembly may result in partial melting of the adhesive layer with the effect that adhesive retracts toward portions of the facing surface that are in direct contact with edge surfaces of the ribs 201(i).

As indicated above, an assembly of the core arrangement 200 and one or both of the front facesheet 2020(1) and the rear facesheet 2020(2), including respective adhesive joints disposed between each facesheet and the core arrangement 200, may be co-cured, under pressure and/or elevated temperatures. For example in some implementations a co-curing process may be carried out at a temperature above 300° F. In some implementations, the co-curing is executed by encapsulating the assembly in a flexible enclosure impermeable to air (a "vacuum bag") and reducing a pressure interior to the flexible enclosure. The interior pressure may be reduced to a near vacuum, resulting in a 1 atmosphere (atm) bonding pressure, implementations in which the co-curing process is executed in a nominal laboratory environment. Some implementations, the co-curing process may be carried out in a barometric chamber, in which bonding pressure substantially higher than 1 atm may be achieved.

Figure 4:
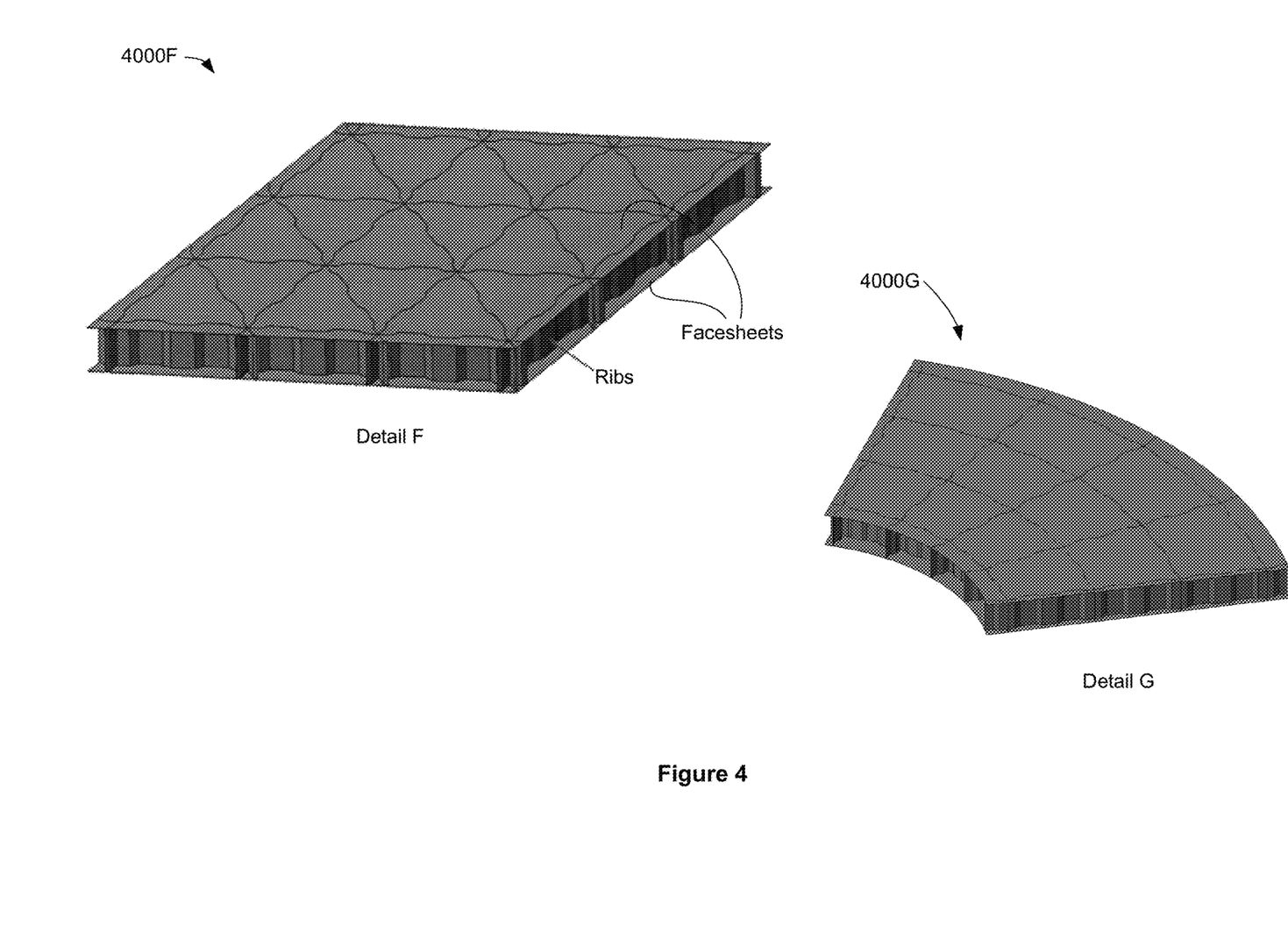
FIG. 4 illustrates a laminate sandwich panel according to another implementation.

Although the arrangement illustrated in FIG. 2 shows the ribs being approximately disposed at right angles, as a result of which cells have an approximately rectangular cross section, other arrangements are contemplated by the present disclosure. FIG. 4 illustrates a laminate sandwich panel according to some implementations. Referring first to Detail F, in the illustrated implementation, a laminate sandwich panel 4000F includes ribs that are arranged in a triaxial arrangement, resulting in cells having a triangular cross section. It will be appreciated that, whether or not the cells are approximately rectangular or triangular, or are configured in yet a different arrangement such as, for example laminate sandwich panel 4000G illustrated in Detail G, cell sizes are not necessarily uniform throughout the core arrangement.

Figure 5:
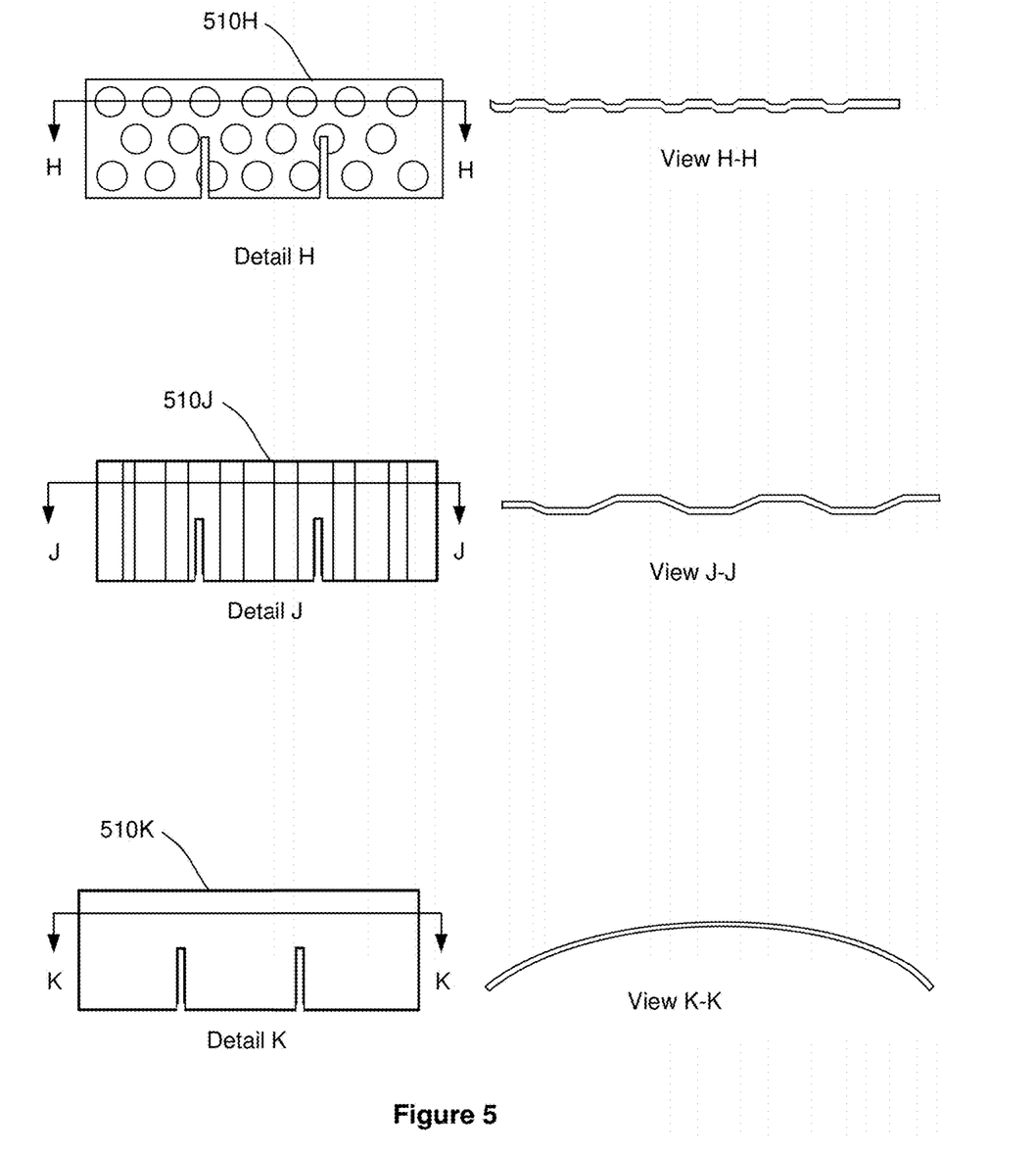
FIG. 5 illustrates examples of ribs according to some implementations.
Figure 6:
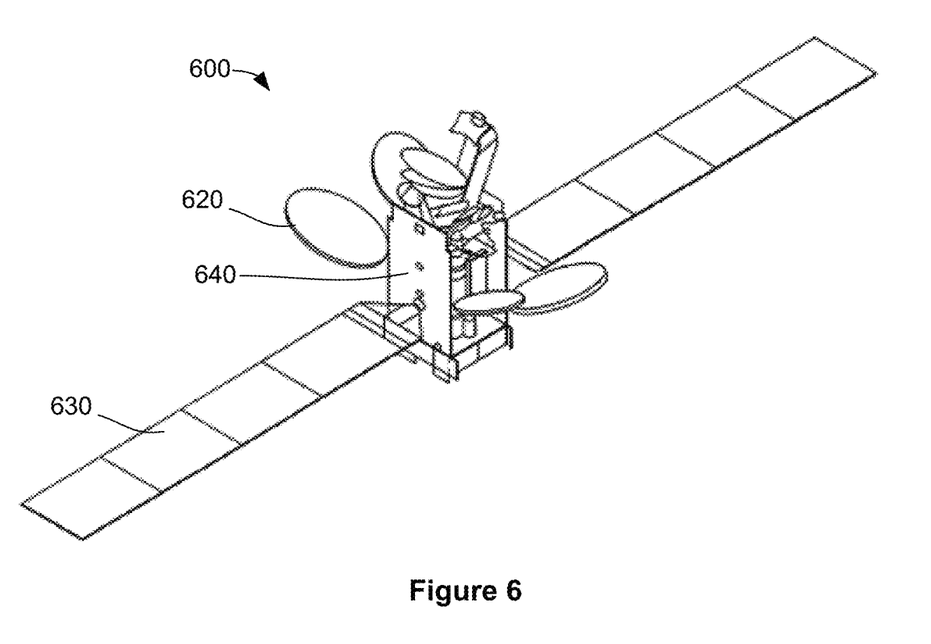
FIG. 6 illustrates an example of a spacecraft according to an implementation.

It will be appreciated that the ribs are not necessarily flat. FIG. 5 illustrates examples of ribs according to some implementations. Detail H and view H-H illustrate an example of a rib 510H that includes a dimpled surface. Detail J and view J-J illustrate an example of a rib 510J that includes a corrugated surface. By configuring a rib with a dimpled or corrugated surface, for example, an increased resistance to buckling loads may be achieved. Whether or not the rib surfaces are dimpled or corrugated, in some implementations, as illustrated in Detail G of FIG. 4 and Detail K of FIG. 5, the ribs may be curved The presently disclosed techniques may advantageously be implemented in a spacecraft. FIG. 6 illustrates an example of a spacecraft according to an implementation. The spacecraft 600 may include any number of antenna reflectors 620, solar array panels 630, and equipment mounting panels 640. Some or all of the antenna reflectors 620, solar array panels 630, and equipment mounting panels 640 may be configured to include a core arrangement as described above bonded with a front facesheet and the rear facesheet using the above disclosed techniques.

Figure 7:
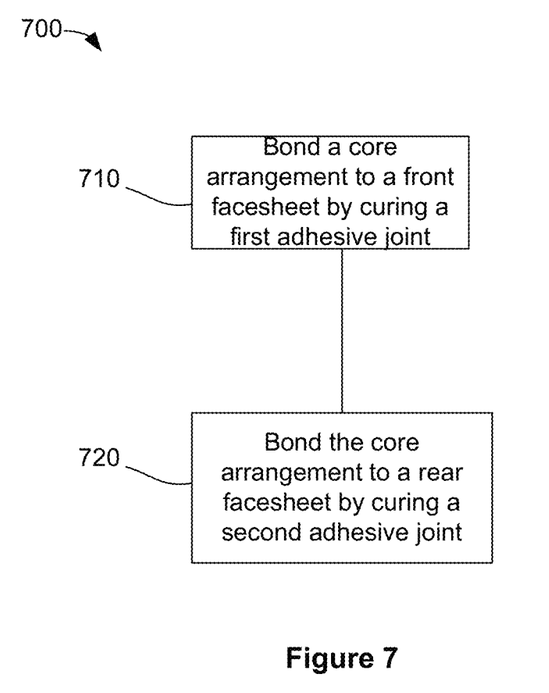
FIG. 7 illustrates a method for fabricating a laminate sandwich panel, according to an implementation.

FIG. 7 illustrates a method for fabricating a laminate sandwich panel, according to an implementation. In the illustrated example, a method 600 includes a step 610 of bonding a core arrangement to a front facesheet by curing a first adhesive joint and a step 620 of bonding a core arrangement to a rear facesheet by curing a second adhesive joint. As described hereinabove, the first adhesive joint and the second adhesive joint may be concurrently cured (co-cured) under pressure. The core arrangement is disposed between the front facesheet and the rear facesheet, and may include a plurality of ribs, the ribs disposed so as to form walls defining a reticulated lattice of cells. The ribs have a thickness in a first direction and a height in a second direction approximately orthogonal to the facesheets and to the first direction that extends between the first adhesive joint and the second adhesive joint, the height being at least 100× larger than the thickness.

Thus, improved laminate Sandwich panel has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A laminated structure comprising:
 a front facesheet;
 a rear facesheet; and
 a core arrangement disposed between the front facesheet and the rear facesheet; wherein
  the core arrangement is bonded to the front facesheet by curing a first adhesive joint, the front facesheet forming a front facing surface, and bonded to the rear facesheet by curing a second adhesive joint, the rear facesheet forming a rear facing surface, the first adhesive joint and the second adhesive joint being concurrently cured (co-cured) under pressure;
  the core arrangement includes a plurality of ribs, the ribs disposed so as to form walls defining a reticulated lattice of cells;
  the ribs have a thickness in a first direction and a height in a second direction approximately orthogonal to the facesheets and to the first direction that extends between the first adhesive joint and the second adhesive joint, the height being at least 100× larger than the thickness;

each cell has three or more walls, each wall formed by a different one of the plurality of ribs, each rib forming a respective wall of at least two different ones of the cells;

the ribs are disposed approximately (a) at right angles, so as to form cells having an approximately rectangular cross section, or (b) in a triaxial arrangement, so as to form cells having a triangular cross section; and one or more of the ribs include a dimpled or corrugated surface for increased resistance to buckling loads.

2. The laminated structure of claim 1, wherein:
each rib has a first edge surface facing the front facesheet and a second edge surface facing the rear facesheet; and
one or both of the first adhesive joint and the second adhesive joint are formed by:
reticulating a first film adhesive over the first edge surfaces;
reticulating a second film adhesive over the second edge surfaces; and
concurrently curing an assembly of the core arrangement coupled with the front facesheet by the first reticulated film adhesive and coupled with the rear facesheet by the second reticulated film adhesive.

3. The laminated structure of claim 2, wherein reticulating one or both of the first film adhesive and the second film adhesive includes:
disposing an adhesive layer upon a facing surface of the core arrangement; and
heating one or both of the adhesive layer and the core arrangement.

4. The laminated structure of claim 2, wherein curing the assembly includes encapsulating the assembly in a flexible enclosure impermeable to air and reducing a pressure interior to the flexible enclosure.

5. The laminated structure of claim 4, wherein a pressure exterior to the flexible enclosure is one atmosphere or greater.

6. The laminated structure of claim 2, wherein curing the assembly includes heating the assembly to an elevated temperature.

7. The laminated structure of claim 6, wherein the elevated temperature is at least 300° F.

8. The laminated structure of claim 2, wherein the first edge surface is not parallel to the second edge surface.

9. The laminated structure of claim 2, wherein one or both of the first edge surface and the second edge surface are curved.

10. The laminated structure of claim 1, wherein one or more of the ribs have a height that varies along a length in a third direction approximately orthogonal to the first direction and the second direction such that, when the ribs are assembled to form the core arrangement, the front facing surface and the rear facing surface are independently shaped to distinctly different contours.

11. A spacecraft comprising:
a laminated structure configured as an equipment panel, a solar array panel or an antenna reflector, the laminated structure including:
a front facesheet;
a rear facesheet; and
a core arrangement disposed between the front facesheet and the rear facesheet, the core arrangement adhered to the front facesheet by a first adhesive joint, the front facesheet forming a front facing surface, and adhered to the rear facesheet by a second adhesive joint, the rear facesheet forming a rear facing surface; wherein
the core arrangement includes a plurality of ribs, the ribs disposed so as to form walls defining a reticulated lattice of cells;
the ribs have a thickness in a first direction and a height in a second direction approximately orthogonal to the facesheets and to the first direction that extends between the first adhesive joint and the second adhesive joint, the height being at least 100× larger than the thickness;
each cell has three or more walls, each wall formed by a different one of the plurality of ribs, each rib forming a respective wall of at least two different ones of the cells;
the ribs are disposed approximately (a) at right angles, so as to form cells having an approximately rectangular cross section, or (b) in a triaxial arrangement, so as to form cells having a triangular cross section;
the first adhesive joint and the second adhesive joint are concurrently cured under pressure; and
one or more of the ribs include a dimpled or corrugated surface for increased resistance to buckling loads.

12. The spacecraft of claim 11, wherein:
each rib has a first edge surface facing the front facesheet and a second edge surface facing the rear facesheet; and
one or both of the first adhesive joint and the second adhesive joint are formed by:
reticulating a first film adhesive over the first edge surfaces;
reticulating a second film adhesive over the second edge surfaces; and
concurrently curing an assembly of the core arrangement coupled with the front facesheet by the first reticulated film adhesive and coupled with the rear facesheet by the second reticulated film adhesive.

13. The spacecraft of claim 12, wherein reticulating one or both of the first film adhesive and the second film adhesive includes:
disposing an adhesive layer upon a facing surface of the core arrangement; and
heating one or both of the adhesive layer and the core arrangement.

14. The spacecraft of claim 11, wherein one or more of the ribs have a height that varies along a length in a third direction approximately orthogonal to the first direction and the second direction such that, when the ribs are assembled to form the core arrangement, the front facing surface and the rear facing surface are independently shaped to distinctly different contours.

15. A method of fabricating a laminated structure, the method comprising:
bonding a core arrangement to a front facesheet by curing a first adhesive joint; and
bonding the core arrangement to a rear facesheet by curing a second adhesive joint, wherein:
the first adhesive joint and the second adhesive joint are concurrently cured (co-cured) under pressure;
the core arrangement is disposed between the front facesheet and the rear facesheet, the core arrangement including a plurality of ribs, the ribs disposed so as to form walls defining a reticulated lattice of cells;

each cell has three or more walls, each wall formed by a different one of the plurality of ribs, each rib forming a respective wall of at least two different ones of the cells;

the ribs are disposed approximately (a) at right angles, so as to form cells having an approximately rectangular cross section, or (b) in a triaxial arrangement, so as to form cells having a triangular cross section;

the ribs have a thickness in a first direction and a height in a second direction approximately orthogonal to the facesheets and to the first direction that extends between the first adhesive joint and the second adhesive joint, the height being at least 100× larger than the thickness; and one or more of the ribs include a dimpled or corrugated surface for increased resistance to buckling loads.

16. The method of claim 15, wherein:

each rib has a first edge surface facing the front facesheet and a second edge surface facing the rear facesheet; and the first adhesive joint and the second adhesive joint are formed by:

reticulating a first film adhesive over the first edge surfaces;

reticulating a second film adhesive over the second edge surfaces; and concurrently curing an assembly of the core arrangement coupled with the front facesheet by the first reticulated film adhesive and coupled with the rear facesheet by the second reticulated film adhesive.

17. The method of claim 16, wherein curing the assembly includes encapsulating the assembly in a flexible enclosure impermeable to air and reducing a pressure interior to the flexible enclosure.

18. The method of claim 16, wherein curing the assembly includes heating the assembly to an elevated temperature.

19. The method of claim 16, wherein one or both of the first edge surface and the second edge surface is curved.

20. The method of claim 15, wherein one or more of the ribs have a height that varies along a length in a third direction approximately orthogonal to the first direction and the second direction such that, when the ribs are assembled to form the core arrangement, the front facing surface and the rear facing surface are independently shaped to distinctly different contours.

* * * * *